W. N. GRUMSTRUP.
EXTENSION TABLE.
APPLICATION FILED JUNE 5, 1911.
1,096,906.
Patented May 19, 1914.
2 SHEETS—SHEET 1.
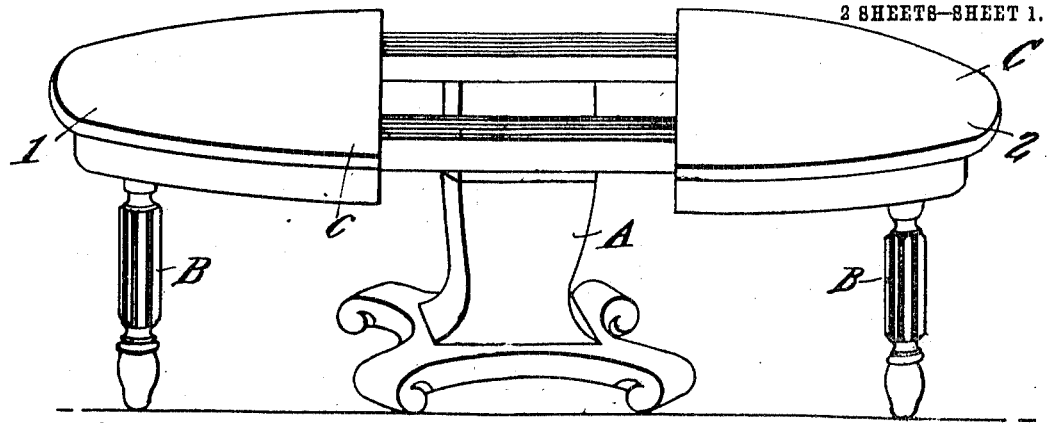
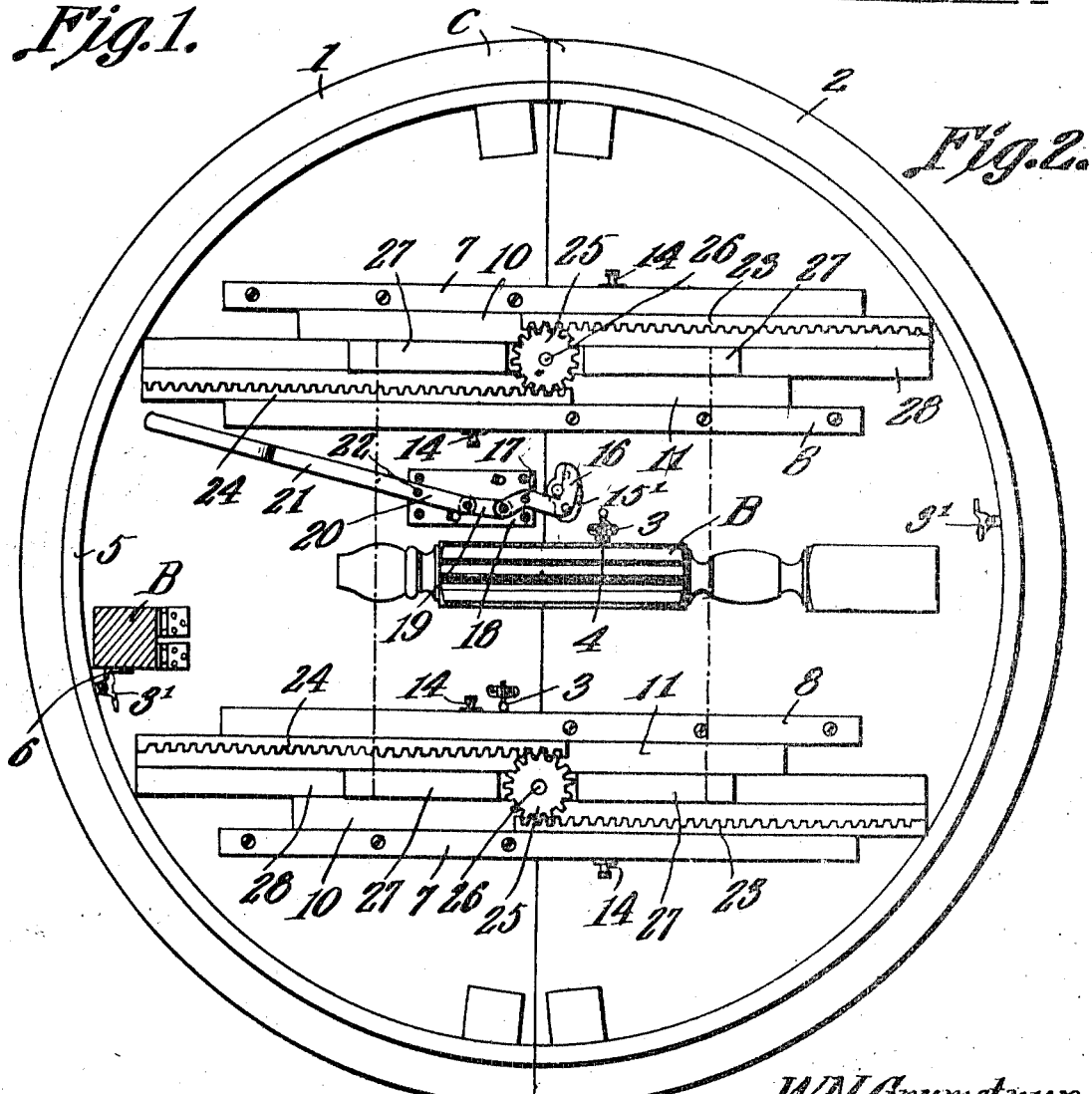

W. N. GRUMSTRUP.
EXTENSION TABLE.
APPLICATION FILED JUNE 5, 1911.
1,096,906.
Patented May 19, 1914.
2 SHEETS—SHEET 2.
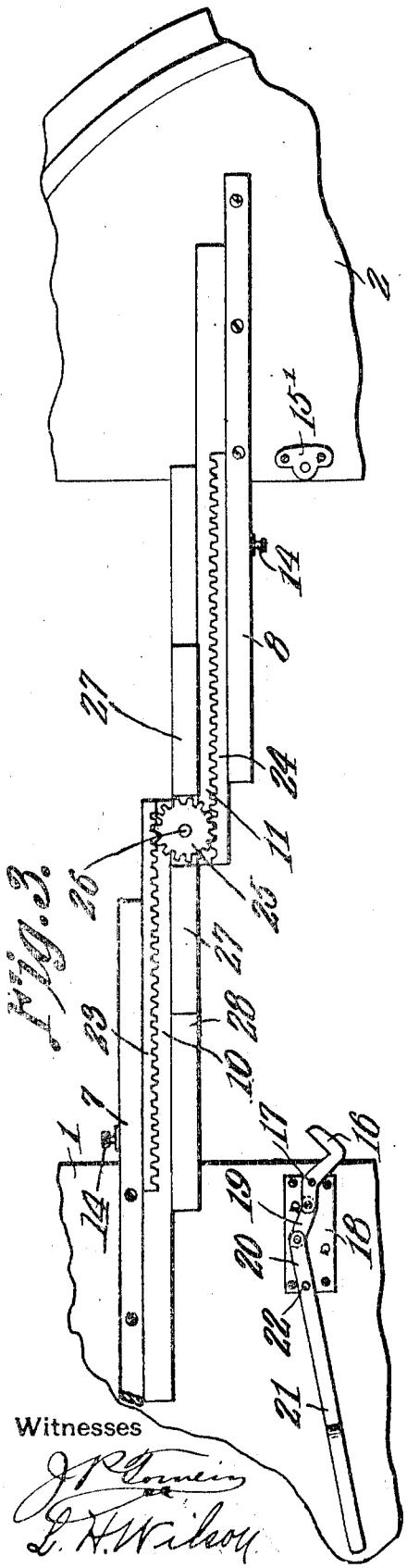
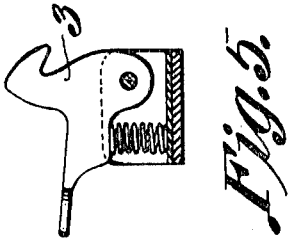
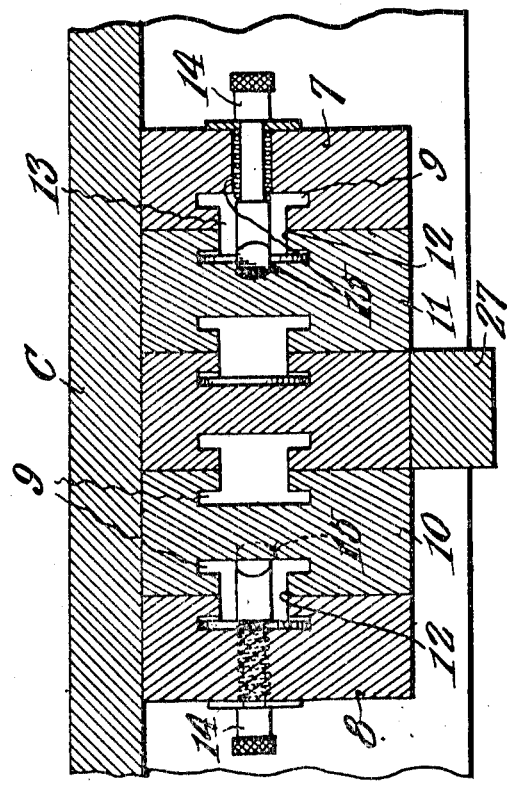
W. N. Grumstrup,
Inventor
by C. A. Snow & Co.
Attorneys

UNITED STATES PATENT OFFICE.

WALDO N. GRUMSTRUP, OF CLINTON, IOWA, ASSIGNOR TO ANDERSON FURNITURE CO., OF CLINTON, IOWA.

EXTENSION-TABLE.

1,096,906.   Specification of Letters Patent.   Patented May 19, 1914.

Application filed June 5, 1911. Serial No. 631,323.

*To all whom it may concern:*

Be it known that I, WALDO N. GRUMSTRUP, a citizen of the United States, residing at Clinton, in the county of Clinton and State of Iowa, have invented a new and useful Extension-Table, of which the following is a specification.

This invention relates to an improvement in extension tables, the primary object of the invention being the provision of a top provided with a series of collapsing slides upon each side of a pedestal, carrying a series of ratchet bars and gears, whereby the top of the table may be separated or closed by a person standing on one side of the pedestal.

A further object of this invention is the provision of an extension table of the pedestal type, having two parallel series of coacting slides, and means carried by each series of coacting slides, whereby the extension of the table is assured of being the same distance upon each side of the center line thereof.

A further object of this invention is the provision of an extension table, the top of which is provided with a series of five slides, each series of the slides being mounted upon opposite sides of the pedestal and two slides of each series being carried by one of the sections or extensions of the table top, the other three slides of each series being floating slides and provided with means to insure the extension or collapsing of the table, whereby the extreme ends of the table will be kept at the same distance from the center of the table.

A still further object of this invention is the provision of an extension top table, provided with coacting slides which will insure the parallel movement of the members of the table top, to and from each other, and still centralize the weight or equilibrium of the top thereof, so that no portion of the table will be moved farther than the other from the center line thereof, when the table is extended or collapsed.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the drawings:—Figure 1 is a perspective view of the table extended. Fig. 2 is a bottom plan view of the top in its collapsed or folded position. Fig. 3 is a detail bottom plan view of one series of slides and a portion of their respective table top, the said slides being in their farthest extended position. Fig. 4 is a cross section through one series of the slides collapsed. Fig. 5 is a detail view of one of the spring catches employed for connecting the folding legs to the under side of the table.

Referring to the drawings, A designates the pedestal and B the legs of an extension table, these legs however may or not be used, as the pedestal may be all that is necessary when the table is extended. However, in this case where the pedestal is not a split or separable pedestal and is not provided with a central leg, as is the usual case, in pedestal tables, the legs B are found necessary and when the table is in collapsed condition the said legs are folded beneath the top C of the table as shown in Fig. 2.

The top of the table is composed of two extensions or sections 1 and 2 each one of which are similar and in this case are shown as forming a circular or round top table. Connected to each section, is a hinged leg B as hereinbefore set forth, which is normally held in collapsed position by means of the spring catch 3, which engages the cleat 4 carried by each leg, said spring catch being connected to the underside of the sections 1 and 2. The spring catches 3' which are connected to the rim 5' of each section are adapted to engage the cleats 6 carried by the legs and hold the legs in extended position as clearly shown in Fig. 1.

Connected to the underside of the respective sections 1 and 2 of the table are the stationary slides, or guide strips 7 and 8 respectively, the said slide 7 being the outer slide and carried by the section 1 of the table top, while the slides 8 are connected permanently and carried by the under side of the section 2, said slides 8 being the inner slides and nearer the pedestal of the table. These slides 7 and 8, as clearly shown in Fig. 4, are provided upon their inner faces with the dove tail slots or grooves 9 while upon the opposed faces of the movable or collapsible slides 10 and 11 of each respective series of slides are the modified dove tail slots or grooves 12, the blocks or guides 13 being H-shape in cross section and are adapted to hold the slides relatively to one another.

By means of the spring actuated pins 14 and the recesses 15 in the sections 7 and 11, and 8 and 10, respectively, the said sections may be locked relative to each other.

In order to lock the two sections of the table closed, the locking device, shown in use in Fig. 2 is employed. The plate 15' is mounted upon the underside of one section and is adapted to have in engagement therewith, the pivoted hook 16 which is pivoted at 17 to the plate 18 carried by the underside of the other section of the table top. The short link 19 connects the short lever of the hook 16, while the short end 20 of the lever 21, which is pivoted at 22, provides a means for placing the hook 16 in engagement with the plate 15' and producing a cam action at the link 19 to hold said strip in locked position, thereby holding the two sections of the table when closed in locked relation.

Mounted upon the underside of the two slides 10 and 11 of each series as clearly shown in Figs. 2 and 3, are the racks 23 and 24, the teeth of said racks being opposed to each other and in engagement at all times with the rotatable gear or toothed wheel 25, which is pivoted at 26, between the projections 27 of the central member 28 of each series of the slides. The head of the pedestal A is attached to the projections or blocks 27, as suggested in the dot and dash lines in Fig. 2. By this means the central point 26 of the gear 25 will at all times remain in the center line of the table either when extended or collapsed. This is accomplished more readily by means of the central section 28 of each series of slides, this section being held between the two sections 10 and 11 in such a manner that the racks 23 and 24 will coact with the gear 25 to permit the even extension of the two sections of the table top, and insure the parallel alinement of each series of slides and the central alinement of the two pins 26, of each one of the gears of a series, as clearly shown in Figs. 2 and 3.

As clearly shown in Fig. 4, the pins 14 being carried by the outer sections 7 and 8 of each series, the said outer slides are locked in position so that the table can only be extended a certain distance, thus by releasing the pins that is pulling them outwardly, the sections 7 and 8 may be extended farther than the position shown in Fig. 3. In this case the member 8 has been entirely disconnected from the section of the table top 1, but this is not necessary as the movement of the said pins 14 will permit said sections 7 and 8, to be moved with relation to the slides 10 and 11 and thereby produce a further extension of the table, although the gear 25 has reached the inner ends of the two respective racks 23 and 24. By this means the two sections of the table may be farther extended to make a full extension table, in which case, the two legs B are dropped and support the ends of the table as shown in Fig. 1.

From the foregoing description taken in connection with the drawings, it is evident that by means of the series of racks and gears carried by the loose or floating members of each series of slides, that the table sections may be separated or collapsed by a person at either end of the table, by simply pulling upon one section to extend the top or by pushing upon one section to collapse the top, the said gears and their respective racks coacting to maintain the central line of the said extensions so that the central line will always be in line with the center of the pedestal of the table. By this means it is also possible to employ a solid central pedestal for the table and not a sectional one, as is the usual custom, and by further providing the extensions with the hingedly mounted legs, the said extensions when extended to their farthest points, may be supported by said legs and thus not disturb the equilibrium of the pedestal and provide a means for giving the table a much greater latitude of extension than with the usual extension tables now provided with the central pedestal.

What is claimed is:—

In an extension table, a pedestal, a pair of parallel slides, each having a pair of depending blocks attached to the head of the pedestal, two pairs of floating slides slidably engaging the opposite sides of the first mentioned slides, a pinion carried by the bottom of each of the first mentioned slides between the said blocks, depending racks carried by the floating slides and intermeshing with the respective pinions, two pairs of slides slidably engaging the remote sides of the floating slides, top sections secured upon the remote ends of the last mentioned slides whereby the top sections may be adjusted relative to the floating slides, and spring pressed catches carried by the last mentioned slides and engageable with the floating slides to lock the top sections relative to the floating slides.

In testimony that I claim the foregoing as my own, I have hereto affixed my signature in the presence of two witnesses.

WALDO N. GRUMSTRUP.

Witnesses:
BERTHA M. JORNS,
HENRY WARNING.